(12) United States Patent
Lorenzzi et al.

(10) Patent No.: US 10,745,318 B2
(45) Date of Patent: Aug. 18, 2020

(54) MATERIAL PROVIDED WITH A STACK HAVING THERMAL PROPERTIES

(71) Applicant: SAINT-GOBAIN GLASS FRANCE, Courbevoie (FR)

(72) Inventors: Jean Carlos Lorenzzi, Paris (FR); Nicolas Mercadier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 177 days.

(21) Appl. No.: 15/742,337

(22) PCT Filed: Jun. 30, 2016

(86) PCT No.: PCT/FR2016/051651
§ 371 (c)(1),
(2) Date: Jan. 5, 2018

(87) PCT Pub. No.: WO2017/006029
PCT Pub. Date: Jan. 12, 2017

(65) Prior Publication Data
US 2018/0194675 A1    Jul. 12, 2018

(30) Foreign Application Priority Data

Jul. 8, 2015 (FR) ...................... 15 56481

(51) Int. Cl.
*C03C 17/36* (2006.01)
*B32B 7/02* (2019.01)
(Continued)

(52) U.S. Cl.
CPC .............. *C03C 17/366* (2013.01); *B32B 7/02* (2013.01); *B32B 7/023* (2019.01); *C03C 17/36* (2013.01);
(Continued)

(58) Field of Classification Search
CPC ......... G02B 5/208; G02B 5/281–5/282; G02B 5/285; B32B 7/00–7/14; C03C 17/00–17/44; C23C 14/00–14/5893
See application file for complete search history.

(56) References Cited

U.S. PATENT DOCUMENTS 7,972,713 B2     7/2011   Fleury et al.
2007/0082206 A1*  4/2007   Hartig ..................... C03C 17/36
                                                      428/432
(Continued)

FOREIGN PATENT DOCUMENTS

EP    0 645 352 A1    3/1995
FR    2 859 721 A1    3/2005
(Continued)

OTHER PUBLICATIONS

"Refractive index of Al:ZnO (Aluminium-doped zinc oxide, AZO)". https://refractiveindex.info/?shelf=other&book=Al—ZnO&page=Treharne. Retrieved Sep. 5, 2019.*

(Continued)

*Primary Examiner* — Prashant J Khatri
(74) *Attorney, Agent, or Firm* — Pillsbury Winthrop Shaw Pittman LLP (57) ABSTRACT

A material includes a transparent substrate coated with a stack of thin layers successively including, starting from the substrate, an alternation of three silver-based functional metal layers of increasing thickness and of four dielectric coatings denoted, starting from the substrate, M1, M2, M3 and M4, wherein each dielectric coating includes at least one high-index dielectric layer, the refractive index of which is at least 2.15 and the optical thickness of which is greater than 20 nm.

16 Claims, 1 Drawing Sheet

(51) Int. Cl.
*B32B 7/023* (2019.01)
*G02B 5/28* (2006.01)

(52) U.S. Cl.
CPC ...... *C03C 17/3626* (2013.01); *C03C 17/3639* (2013.01); *C03C 17/3642* (2013.01); *C03C 17/3644* (2013.01); *C03C 17/3649* (2013.01); *C03C 17/3652* (2013.01); *C03C 17/3681* (2013.01); *C03C 17/3689* (2013.01); *C03C 2217/212* (2013.01); *C03C 2217/216* (2013.01); *C03C 2217/23* (2013.01); *C03C 2217/256* (2013.01); *C03C 2217/27* (2013.01); *C03C 2217/281* (2013.01); *C03C 2218/156* (2013.01); *G02B 5/282* (2013.01); *G02B 5/285* (2013.01)

(56) References Cited

U.S. PATENT DOCUMENTS

2014/0362434 A1* 12/2014 Schmitz .................. H05B 3/84
 359/350
2015/0004383 A1* 1/2015 Sandre-Chardonnal ....................
 H01L 51/5203
 428/213

FOREIGN PATENT DOCUMENTS

| WO | WO 2012/093238 A1 | 7/2012 | |
|---|---|---|---|
| WO | WO 2013/104438 A1 | 7/2013 | |
| WO | WO-2013107983 A1 * | 7/2013 | ............. C03C 17/36 |
| WO | WO 2014/095388 A1 | 6/2014 | |

OTHER PUBLICATIONS

International Search Report as issued in International Patent Application No. PCT/FR2016/051651, dated Oct. 10, 2016.

* cited by examiner

MATERIAL PROVIDED WITH A STACK HAVING THERMAL PROPERTIES

CROSS-REFERENCE TO RELATED APPLICATIONS

This application is the U.S. National Stage of PCT/FR2016/051651, filed Jun. 30, 2016, which in turn claims priority to French patent application number 1556481 filed Jul. 8, 2015. The content of these applications are incorporated herein by reference in their entireties.

The invention relates to a material comprising a transparent substrate coated with a stack of thin layers comprising several functional layers which can influence solar radiation and/or infrared radiation. The invention also relates to the glazings comprising these materials and also to the use of such materials for manufacturing thermal insulation and/or solar protection glazings.

These glazings may be intended to equip both buildings and vehicles, in particular with a view to reducing the air-conditioning load and/or preventing excessive overheating, known as "solar control" glazings, and/or reducing the amount of energy dissipated toward the outside, known as "low-e" glazings, driven by the ever increasing prevalence of glazed surfaces in buildings and vehicle passenger compartments.

Glazings comprising transparent substrates coated with a stack of thin layers comprising three functional metal layers, each positioned between two dielectric coatings, have been provided in order to improve solar protection while retaining a high light transmission. These stacks are generally obtained by a sequence of depositions carried out by cathode sputtering, optionally assisted by a magnetic field. These glazings are described as selective as they make it possible:

- to reduce the amount of solar energy penetrating inside the buildings while exhibiting a low solar factor (SF or g),
- to guarantee a high light transmission.

According to the invention:

- solar factor "g" is understood to mean the ratio, as percentage, of the total energy entering the premises through the glazing to the incident solar energy,
- selectivity "s" is understood to mean the ratio of the light transmission to the solar factor LT/g.

The patent application EP 0 645 352 discloses, for example, a transparent substrate comprising a stack of thin layers comprising at least three silver-based functional metal layers (hereinafter silver layer). The thicknesses of the silver layers increase as a function of the distance from the substrate. The glazings comprising these substrates, although exhibiting a pleasant esthetic appearance, do not exhibit a selectivity of greater than 2.0 and/or a solar factor of less than 35% for a light transmission of approximately 70%. In point of fact, it is extremely difficult to retain both a good selectivity and esthetically acceptable colors in transmission and in reflection with in particular an appearance of the glazing seen from the inside of neutral color.

The object of the invention is to develop a material exhibiting improved solar control properties and in particular solar factor values of less than or equal to 34% for a light transmission of at least 65%. According to the invention, the aim is thus to minimize the solar factor and to increase the selectivity, while retaining a high light transmission, in order to make possible good insulation and good viewing.

The complexity of the stacks comprising three functional layers makes it difficult to improve these thermal performance results and the properties in transmission without harming the other properties of the stack.

The aim of the invention is thus to overcome these disadvantages by developing a substrate comprising a stack comprising at least three silver layers which exhibits a high selectivity, that is to say an LT/g ratio which is as high as possible for a given LT value, while guaranteeing an appearance, in particular in external reflection, in internal reflection and in transmission, which is pleasant to the eye. The appearance pleasant to the eye is expressed by colors being obtained, both from the outside and from the inside, which are more neutral, in the blue-green range, and which in addition vary little according to the angle of observation.

The applicant has discovered, surprisingly, that, by combining the use of three silver layers of increasing thickness and of high-index dielectric materials in each dielectric coating in high proportions, the selectivity is considerably increased while retaining neutral colors for the stacks, in comparison with the existing solutions.

A subject matter of the invention is a material as defined in claim 1. This material a transparent substrate coated with a stack of thin layers successively comprising, starting from the substrate, an alternation of three silver-based functional metal layers denoted, starting from the substrate, first, second and third functional layers, the thicknesses of the functional metal layers, starting from the substrate, increase as a function of the distance from the substrate, and of four dielectric coatings denoted, starting from the substrate, M1, M2, M3 and M4, each dielectric coating comprising at least one dielectric layer, so that each functional metal layer is positioned between two dielectric coatings, characterized in that:

- the dielectric coatings M1, M2, M3 and M4 each have an optical thickness To1, To2, To3 and To4,
- each dielectric coating comprises at least one high-index dielectric layer, the refractive index of which is at least 2.15 and the optical thickness of which is greater than 20 nm,
- the sum of the optical thicknesses of all the high-index dielectric layers of one and the same dielectric coating is denoted, according to the dielectric coating concerned, $Tohi1$, $Tohi2$, $Tohi3$ or $Tohi4$,
- each dielectric coating satisfies the following relationship:

$$Tohi1/To1 > 0.30,$$

$$Tohi2/To2 > 0.30,$$

$$Tohi3/To3 > 0.30,$$

$$Tohi4/To4 > 0.30.$$

The solution of the invention represents an excellent compromise between the optical and thermal performance results, the transparency and the esthetic appearance.

The invention also relates:

- to the process for obtaining a material according to the invention,
- to the glazing comprising at least one material according to the invention,
- to the use of a glazing according to the invention as solar control glazing for the building,
- to a building comprising a glazing according to the invention.

By modulating the thicknesses of the functional layers and of the dielectric coatings, the transparency of the glazing can be controlled so as to obtain LT values of the order of 65%. However, the major advantage of the invention is that the satisfactory visual appearance with in particular specific colors in external reflection and also external reflection values which are sufficiently low are not obtained to the detriment of the solar protection performance results. Excellent energy performance results are obtained without requiring substantial modifications to the other parameters of the stack, such as the nature, the thickness and the sequence of the layers constituting it.

The preferred characteristics which appear in the continuation of the description are applicable both to the process according to the invention and, if appropriate, to the products, that is to say to the materials or to the glazings comprising the material.

All the light characteristics presented in the description are obtained according to the principles and methods described in the European standard EN 410 relating to the determination of the light and solar characteristics of the glazings used in the glass for the construction industry.

Conventionally, the refractive indices are measured at a wavelength of 550 nm. The light transmission LT and light reflection LR factors are measured under the illuminant D65 with a field of vision of 2°.

Unless otherwise indicated, all the values and ranges of values for the optical and thermal characteristics are given for a double glazing consisting of a 6-mm substrate of ordinary soda-lime glass type carrying the stack of thin layers, of a 16-mm interlayer space filled with argon in a proportion of 90% and with air in a proportion of 10%, and of another uncoated substrate of soda-lime glass type with a thickness of 4 mm. The coated substrate is placed so that the stack of thin layers occurs on face 2 of the glazing. The external reflection Rext. is observed from the side of the substrate comprising the stack, while the reflection observed from the side of the substrate not comprising the stack is denoted as the internal reflection. The light transmission (LT) of the substrates of ordinary soda-lime glass type, without stack, is greater than 89%, preferably of 90%

Unless otherwise mentioned, the thicknesses touched on in the present document, without other information, are real or geometrical physical thicknesses denoted Tp and are expressed in nanometers (and not optical thicknesses). The optical thickness To is defined as the physical thickness of the layer under consideration multiplied by its refractive index at the wavelength of 550 nm: To=n*Tp. As the refractive index is a dimensionless value, it may be considered that the unit of the optical thickness is that chosen for the physical thickness.

If a dielectric coating is composed of several dielectric layers, the optical thickness of the dielectric coating corresponds to the sum of the optical thicknesses of the different dielectric layers constituting the dielectric coating.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

Within the meaning of the present invention, the labels "first", "second", "third" and "fourth" for the functional layers or the dielectric coatings are defined starting from the substrate carrying the stack and with reference to the layers or coatings having the same function. For example, the closest functional layer to the substrate is the first functional layer, the following moving away from the substrate is the second functional layer, and so on.

The invention also relates to a glazing comprising a material according to the invention. Conventionally, the faces of a glazing are designated starting from the exterior of the building and by numbering the faces of the substrates from the outside towards the inside of the passenger compartment or of the premises which it equips. This means that the incident sunlight passes through the faces in increasing numerical order.

Preferably, the stack is deposited by magnetic-field-assisted cathode sputtering (magnetron process). According to this advantageous embodiment, all the layers of the stack are deposited by magnetic-field-assisted cathode sputtering.

The invention also relates to the process for obtaining a material according to the invention, in which the layers of the stack are deposited by magnetron cathode sputtering.

The silver-based functional metal layers comprise at least 95.0%, preferably at least 96.5% and better still at least 98.0% by weight of silver, with respect to the weight of the functional layer. The silver-based functional metal layer preferably comprises less than 1.0% by weight of metals other than silver, with respect to the weight of the silver-based functional metal layer.

The characteristic according to which the thicknesses of the functional metal layers starting from the substrate increase means that the thickness of the third functional metal layer is greater than that of the second functional metal layer and in that the thickness of the second functional metal layer is greater than that of the first functional metal layer. The increase in thickness between two successive functional layers is, by increasing order of preference, greater than 2 nm, greater than 3 nm, greater than 4 nm.

According to advantageous embodiments of the invention, the functional metal layers satisfy one or more of the following conditions:
- the three functional metal layers correspond to the first, to the second and to the third functional metal layer defined starting from the substrate,
- the ratio of the thickness of the second metal layer to the thickness of the first functional metal layer is, by increasing order of preference, between 1.10 and 2.00, between 1.20 and 1.80, between 1.40 and 1.60, including these values, and/or
- the ratio of the thickness of the third metal layer to the thickness of the second functional metal layer is, by increasing order of preference, between 1.10 and 1.80, between 1.15 and 1.60, between 1.20 and 1.40, including these values, and/or
- the thickness of the first functional metal layer is, by increasing order of preference, between 6 and 12 nm, between 7 and 11 nm, between 8 and 10 nm, and/or
- the thickness of the second functional metal layer is, by increasing order of preference, between 11 and 20 nm, between 12 and 18 nm, between 13 and 15 nm, and/or
- the thickness of the third functional metal layer is, by increasing order of preference, between 15 and 22 nm, between 16 and 20 nm, between 17 and 19 nm, and/or
- the total thickness of the functional metal layers is between 30 and 50 nm, including these values, preferably between 35 and 45 nm.

These ranges of thickness for the functional metal layers are the ranges for which the best results are obtained for a light transmission in a double glazing of at least 65%, a low light reflection and a low solar factor. A high selectivity and neutral colors are thus obtained.

The stack can additionally comprise at least one blocking layer located in contact with a functional layer.

The blocking layers conventionally have the role of protecting the functional layers from possible damage during the deposition of the upper antireflective coating and during a possible high-temperature heat treatment of the annealing, bending and/or tempering type.

The blocking layers are chosen from metal layers based on a metal or on a metal alloy, metal nitride layers, metal oxide layers and metal oxynitride layers of one or more elements chosen from titanium, nickel, chromium and niobium, such as Ti, TiN, $TiO_x$, Nb, NbN, Ni, NiN, Cr, CrN, NiCr or NiCrN. When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the blocking layer or layers satisfy one or more of the following conditions:
  each functional metal layer is in contact with at least one blocking layer chosen from a blocking underlayer and a blocking overlayer, and/or
  each functional metal layer is in contact with a blocking overlayer, and/or
  the thickness of each blocking layer is at least 0.1 nm, preferably between 0.5 and 2.0 nm, and/or
  the total thickness of all the blocking layers in contact with the functional layers is between 0.5 and 5 nm, including these values, preferably between 1 and 3 nm, indeed even 1 and 2 nm.

According to the invention, each dielectric coating comprises at least one high-index dielectric layer. High-index layer is understood to mean a layer, the refractive index of which is at least 2.15.

The high-index layers according to the invention can be chosen from:
  a layer of titanium oxide $TiO_2$ (index at 500 of 2.45),
  a layer of manganese oxide MnO (index at 550 nm of 2.16),
  a layer of tungsten oxide $WO_3$ (index at 550 nm of 2.15),
  a layer of niobium oxide $Nb_2O_5$ (index at 550 nm of 2.30),
  a layer of bismuth oxide $Bi_2O_3$ (index at 550 nm of 2.60),
  a layer of zirconium nitride $Zr_3N_4$ (index at 550 nm of 2.55),
  a layer of zirconium silicon nitride (index at 550 nm between 2.20 and 2.25).

The high-index layers according to the invention exhibit a refractive index, by increasing order of preference, of less than or equal to 2.60, of less than or equal to 2.50, of less than or equal to 2.40, of less than or equal to 2.35, of less than or equal to 2.30.

The dielectric coatings can comprise one or more high-index layers which are different or of the same nature. Preferably, the high-index layers are layers of zirconium silicon nitride.

According to one embodiment, at least one dielectric coating does not comprise a high-index dielectric layer based on titanium oxide with an optical thickness of greater than 20 nm. According to one embodiment, no dielectric coating comprises a high-index dielectric layer based on titanium oxide with an optical thickness of greater than 20 nm.

According to advantageous embodiments of the invention, the high-index dielectric layers of the dielectric coatings satisfy one or more of the following conditions in terms of thicknesses:
  the sum of the optical thicknesses of all the high-index dielectric layers of one and the same dielectric coating is denoted, according to the dielectric coating concerned, Tohi1, Tohi2, Tohi3 or Tohi4,
  the sum of the optical thicknesses of all the high-index dielectric layers of the first dielectric coating satisfies the following relationships, by increasing order of preference, Tohi1/To1>0.30, Tohi1/To1>0.40, Tohi1/To1>0.50, Tohi1/To1>0.60, Tohi1/To1>0.70, Tohi1/To1>0.80, Tohi1/To1>0.85, and/or
  the sum of the optical thicknesses of all the high-index dielectric layers of the first dielectric coating satisfies the following relationships, by increasing order of preference, Tohi1/To1<0.95, Tohi1/To1<0.90, and/or
  the sum of the optical thicknesses of all the high-index dielectric layers of the second dielectric coating satisfies the following relationships, by increasing order of preference, Tohi2/To2>0.30, Tohi2/To2>0.40, Tohi2/To2>0.50, Tohi2/To2>0.60, Tohi2/To2>0.70, Tohi2/To2>0.80, Tohi2/To2>0.85, and/or
  the sum of the optical thicknesses of all the high-index dielectric layers of the second dielectric coating satisfies the following relationships, by increasing order of preference, Tohi2/To2<0.95, Tohi2/To2<0.90,
  the sum of the optical thicknesses of all the high-index dielectric layers of the third dielectric coating satisfies the following relationships, by increasing order of preference, Tohi3/To3>0.30, Tohi3/To3>0.40, Tohi3/To3>0.50, Tohi3/To3>0.60, Tohi3/To3>0.70, Tohi3/To3>0.80, Tohi3/To3>0.85, and/or
  the sum of the optical thicknesses of all the high-index dielectric layers of the third dielectric coating satisfies the following relationships, by increasing order of preference, Tohi3/To3<0.95, Tohi3/To3<0.90,
  the sum of the optical thicknesses of all the high-index dielectric layers of the fourth dielectric coating satisfies the following relationships, by increasing order of preference, Tohi4/To4>0.30, Tohi4/To4>0.40, Tohi4/To4>0.50, Tohi4/To4>0.60, Tohi4/To4>0.70, Tohi4/To4>0.80, Tohi4/To4>0.85, and/or
  the sum of the optical thicknesses of all the high-index dielectric layers of the fourth dielectric coating satisfies the following relationships, by increasing order of preference, Tohi4/To4<0.95, Tohi4/To4<0.90.

According to advantageous embodiments of the invention, the high-index dielectric layers of the dielectric coatings satisfy one or more of the following conditions:
  at least one dielectric coating comprises a high-index dielectric layer based on zirconium silicon nitride,
  at least two dielectric coatings comprise a high-index dielectric layer based on zirconium silicon nitride,
  at least three dielectric coatings comprise a high-index dielectric layer based on zirconium silicon nitride,
  each dielectric coating comprises a high-index dielectric layer based on zirconium silicon nitride.

When the high-index dielectric layer is based on zirconium silicon nitride, it comprises, by increasing order of preference:
  between 30% and 70%, between 40% and 60%, between 45% and 55%, by weight of silicon, with respect to the total weight of silicon and zirconium in the high-index layer, between 30% and 70%, between 40% and 60%, between 45% and 55%, by weight of zirconium, with respect to the total weight of silicon and zirconium in the high-index layer.

When the high-index dielectric layer is based on zirconium silicon nitride, it comprises, by increasing order of preference:
- between 50 at. % and 95 at. %, between 60 at. % and 90 at. %, between 75 at. % and 85 at. %, of silicon, with respect to the silicon and zirconium in the high-index layer,
- between 5 at. % and 50 at. %, between 10 at. % and 40 at. %, between 15 at. % and 25 at. %, of zirconium, with respect to the silicon and zirconium in the high-index layer.

The silicon and zirconium layers can be deposited from a silicon and zirconium metal target.

It is possible to provide another element, such as, for example, aluminum, for example, in order to increase the conductivity of a target based on silicon and zirconium. The metal target can thus additionally comprise aluminum, which will then be found in the high-index layer.

When the high-index dielectric layer additionally comprises aluminum, it comprises, by increasing order of preference, between 1% and 10%, between 2% and 8%, between 3% and 6%, by weight of aluminum, with respect to the total weight of aluminum, silicon and zirconium in the high-index layer.

In this case, in order to obtain the desired index, it is preferable for the proportions by weight, with respect to the total weight of silicon, zirconium and aluminum in the high-index layer, to be chosen within the following ranges:
- between 40% and 60% of silicon, including these values,
- between 40% and 60% of zirconium, including these values,
- between 1% and 10% of aluminum, including these values.

According to advantageous embodiments of the invention, the dielectric coatings satisfy one or more of the following conditions in terms of thicknesses:
- each dielectric coating comprises at least one high-index dielectric layer, the refractive index of which is greater than 2.15 and the optical thickness of which is greater than 20 nm,
- the dielectric coatings M1, M2, M3 and M4 each have an optical thickness To1, To2, To3 and To4 satisfying the following relationship: To4<To1<To2<To3,
- the optical thickness of the first dielectric coating M1 is, by increasing order of preference, from 60 to 140 nm, from 80 to 120 nm, from 90 to 100 nm, and/or
- the physical thickness of the first dielectric coating M1 is, by increasing order of preference, from 30 to 60 nm, from 35 to 55 nm, from 35 to 45 nm, and/or
- the optical thickness of the second dielectric coating M2 is, by increasing order of preference, from 120 to 180 nm, from 130 to 170 nm, from 140 to 160 nm, and/or
- the physical thickness of the second dielectric coating M2 is, by increasing order of preference, from 50 to 100 nm, from 60 to 80 nm, from 65 to 75 nm, and/or
- the optical thickness of the third dielectric coating M3 is, by increasing order of preference, from 140 to 200 nm, from 150 to 180 nm, from 160 to 170 nm, and/or
- the physical thickness of the third dielectric coating M3 is, by increasing order of preference, from 50 to 100 nm, from 65 to 95 nm, from 70 to 80 nm, and/or
- the optical thickness of the fourth dielectric coating M4 is, by increasing order of preference, from 50 to 120 nm, from 60 to 100 nm, from 70 to 90 nm, and/or
- the physical thickness of the fourth dielectric coating M4 is, by increasing order of preference, from 20 to 50 nm, from 25 to 45 nm, from 30 to 40 nm, and/or According to advantageous embodiments of the invention, the dielectric coatings satisfy one or more of the following conditions:
- at least one dielectric coating additionally comprises at least one dielectric layer, the refractive index of which is less than 2.15,
- at least two dielectric coatings additionally comprise at least one dielectric layer, the refractive index of which is less than 2.15,
- at least three dielectric coatings additionally comprise at least one dielectric layer, the refractive index of which is less than 2.15,
- each dielectric coating additionally comprises at least one dielectric layer, the refractive index of which is less than 2.15,
- the dielectric layers, the refractive index of which is less than 2.15, can be based on an oxide or on a nitride of one or more elements chosen from silicon, zirconium, titanium, aluminum, tin or zinc, and/or
- at least one dielectric coating comprises at least one dielectric layer having a barrier function, and/or
- each dielectric coating comprises at least one dielectric layer having a barrier function, and/or
- the dielectric layers having a barrier function preferably have a refractive index of less than 2.15, and/or
- the dielectric layers having a barrier function are based on compounds of silicon and/or aluminum chosen from oxides, such as $SiO_2$ and $Al_2O_3$, silicon nitrides $Si_3N_4$ and AlN, and oxynitrides $SiO_xN_Y$ and $AlO_xN_Y$, and/or
- the dielectric layers having a barrier function are based on compounds of silicon and/or aluminum optionally comprise at least one other element, such as aluminum, hafnium and zirconium, and/or
- at least one dielectric coating comprises at least one dielectric layer having a stabilizing function, and/or
- each dielectric coating comprises at least one dielectric layer having a stabilizing function, and/or
- the dielectric layers having a stabilizing function preferably have a refractive index of less than 2.15, and/or
- the dielectric layers having a stabilizing function are preferably based on an oxide chosen from zinc oxide, tin oxide, zirconium oxide or a mixture of at least two of them,
- the dielectric layers having a stabilizing function are preferably based on crystalline oxide, in particular based on zinc oxide, optionally doped using at least one other element, such as aluminum, and/or
- each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide,
- at least one dielectric coating located below a functional metal layer comprises at least one dielectric layer having a smoothing function, and/or
- each dielectric coating located below a functional metal layer comprises at least one dielectric layer having a smoothing function, and/or the dielectric layers having a smoothing function are preferably based on a mixed oxide of at least two metals chosen from Sn, Zn, In and Ga, the dielectric layers having a smoothing function are preferably layers of a mixed oxide of zinc and tin which are optionally doped, the dielectric layers having a smoothing function preferably have a refractive index of less than 2.15.

Preferably, each dielectric coating consists solely of one or more dielectric layers. Preferably, there is thus no absorbing layer in the dielectric coatings, in order not to reduce the light transmission.

The stacks of the invention can comprise dielectric layers having a barrier function. Dielectric layers having a barrier function is understood to mean a layer made of a material capable of forming a barrier to the diffusion of oxygen and water at high temperature, originating from the ambient atmosphere or from the transparent substrate, toward the functional layer. The constituent materials of the dielectric layer having a barrier function thus must not undergo chemical or structural modification at high temperature which would result in a modification to their optical properties. The layer or layers having a barrier function are preferably also chosen such that they are made of a material capable of forming a barrier to the constituent material of the functional layer. The dielectric layers having a barrier function thus make it possible for the stack to undergo, without excessively great optical change, heat treatments of the annealing, tempering or bending type.

The stacks of the invention can comprise dielectric layers having a stabilizing function. Within the meaning of the invention, "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be above and/or below at least one functional layer or each functional layer, either directly in contact therewith or separated by a blocking layer.

Advantageously, each dielectric layer having a barrier function is separated from a functional layer by at least one dielectric layer having a stabilizing function.

This dielectric layer having a stabilizing function can have a thickness of at least 4 nm, in particular a thickness of between 4 and 10 nm and better still of 8 to 10 nm.

The stack of thin layers can optionally comprise a smoothing layer. Smoothing layer is understood to mean a layer, the function of which is to promote the growth of the stabilizing layer along a preferred crystallographic orientation which promotes the crystallization of the silver layer by epitaxia phenomena. The smoothing layer is located below and preferably in contact with a stabilizing layer.

The smoothing layer based on a mixed oxide can be described as "noncrystalline" in the sense that it can be completely amorphous or partially amorphous and thus partially crystalline, but that it cannot be completely crystalline, over the whole of its thickness. It cannot be of metal nature as it is based on a mixed oxide (a mixed oxide is an oxide of at least two elements).

The index of the smoothing layer is preferably less than 2.15. Furthermore, the smoothing layer preferably exhibits a thickness of between 0.1 and 30 nm and more preferably of between 0.2 and 10 nm.

The stack of thin layers can optionally comprise a protective layer. The protective layer is preferably the final layer of the stack, that is to say the layer furthest from the substrate coated with the stack. These upper protective layers are regarded as included in the fourth dielectric coating. These layers generally have a thickness of between 2 and 10 nm, preferably 2 and 5 nm. This protective layer can be chosen from a layer of titanium, zirconium, hafnium, zinc and/or tin, this or these metals being in the metal, oxide or nitride form.

The protective layer can, for example, be chosen from a layer of titanium oxide, a layer of tin zinc oxide or a layer of titanium zirconium oxide.

A particularly advantageous embodiment relates to a substrate coated with a stack, defined starting from the transparent substrate, comprising:

a first dielectric coating comprising at least one high-index layer, optionally a layer having a barrier function, a dielectric layer having a stabilizing function, optionally a blocking layer, a first functional layer, optionally a blocking layer, a second dielectric coating comprising at least one lower dielectric layer having a stabilizing function, optionally a layer having a barrier function, a high-index dielectric layer, optionally a layer having a smoothing function, an upper dielectric layer having a stabilizing function, optionally a blocking layer, a second functional layer, optionally a blocking layer, a third dielectric coating comprising at least one lower dielectric layer having a stabilizing function, optionally a layer having a barrier function, a high-index dielectric layer, optionally a layer having a smoothing function, an upper dielectric layer having a stabilizing function, optionally a blocking layer, a third functional layer, optionally a blocking layer, a fourth dielectric coating comprising at least one dielectric layer having a stabilizing function, optionally a layer having a barrier function, a high-index dielectric layer and optionally a protective layer.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:

polyethylene, polyesters, such as polyethylene terephthalate (PET), polybutylene terephthalate (PBT) or polyethylene naphthalate (PEN);

polyacrylates, such as polymethyl methacrylate (PMMA);

polycarbonates;

polyurethanes;

polyamides;

polyimides;

fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);

photocrosslinkable and/or photopolymerizable resins, such as thiolene, polyurethane, urethane-acrylate or polyester-acrylate resins, and polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the substrate coated with the stack, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The stack is preferably positioned in the glazing so that the incident light originating from the outside passes through the first dielectric coating before passing through the first functional metal layer. The stack is not deposited on the face of the substrate defining the exterior wall of the glazing but on the interior face of this substrate. The stack is thus advantageously positioned on face 2, the face 1 of the glazing being the outermost face of the glazing, as usual.

The glazing of the invention can be in the form of a monolithic, laminated or multiple glazing, in particular double glazing or triple glazing. The glazing of the invention is preferably a multiple glazing. A multiple glazing comprises at least one first transparent substrate and one second transparent substrate which are parallel and separated by a gas-filled cavity, at least one of the substrates of which is coated with a stack of thin layers. The materials according to the invention are very particularly suitable when they are used in double glazings having enhanced thermal insulation (ETI).

In the case of a monolithic or multiple glazing, the stack is preferably deposited on face 2, that is to say that it is found on the substrate defining the exterior wall of the glazing and more specifically on the interior face of this substrate.

A monolithic glazing comprises 2 faces; the face 1 is outside the building and thus constitutes the exterior wall of the glazing and the face 2 is inside the building and thus constitutes the interior wall of the glazing.

A double glazing comprises 4 faces; the face 1 is outside the building and thus constitutes the exterior wall of the glazing and the face 4 is inside the building and thus constitutes the interior wall of the glazing, the faces 2 and 3 being inside the double glazing.

In the same way, a triple glazing comprises 6 faces; the face 1 is outside the building (exterior wall of the glazing), the face 6 is inside the building (interior wall of the glazing) and the faces 2 to 5 are inside the triple glazing.

A laminated glazing comprises at least one structure of first substrate/sheet(s)/second substrate type. The stack of thin layers is positioned on one at least of the faces of one of the substrates. The stack can be on the face of the second substrate not in contact with the sheet, preferably polymer sheet. This embodiment is advantageous when the laminated glazing is fitted in a double glazing with a third substrate.

The glazing according to the invention, used as monolithic glazing or in a multiple glazing of double glazing type, exhibits colors in external reflection which are neutral, pleasant and subdued, within the range of the blues or blue-greens (values for dominant wavelength of the order of 470 to 500 nanometers). Furthermore, this visual appearance remains virtually unchanged whatever the angle of incidence with which the glazing is observed (normal incidence and under an angle). This means that an observer does not have the impression of a significant lack of uniformity in color or in appearance.

"Color in the blue-green range" should be understood as meaning, within the meaning of the present invention, that, in the L*a*b* color measurement system, a* is between −10.0 and 0.0, preferably between −5.0 and 0.0, and b* is between −10.0 and 0.0, preferably between −5.0 and 0.0.

According to advantageous embodiments, the glazing of the invention, in the form of a double glazing comprising the stack positioned on face 2, makes it possible in particular to achieve the following performance results:

a solar factor g of less than or equal to 34.0%, preferably of less than or equal to 33.5%, indeed even of less than or equal to 33.0%, and/or a light transmission, by increasing order of preference, of greater than 65%, of greater than 67%, of greater than 68%, of greater than 69%, preferably of between 65% and 75%, indeed even of between 67% and 71%, and/or a high selectivity, by increasing order of preference, of at least 2.0, of at least 2.05, of at least 2.1, and/or a light reflection, exterior side, of less than or equal to 20%, preferably of less than or equal to 15%, and/or a light reflection, interior side, of less than or equal to 20%, preferably of less than or equal to 15%, and/or neutral colors in external reflection.

The details and advantageous characteristics of the invention emerge from the following nonlimiting examples, illustrated by means of the appended figure.

The proportions between the various components are not observed in order to make the figures easier to read.

Figure 1:
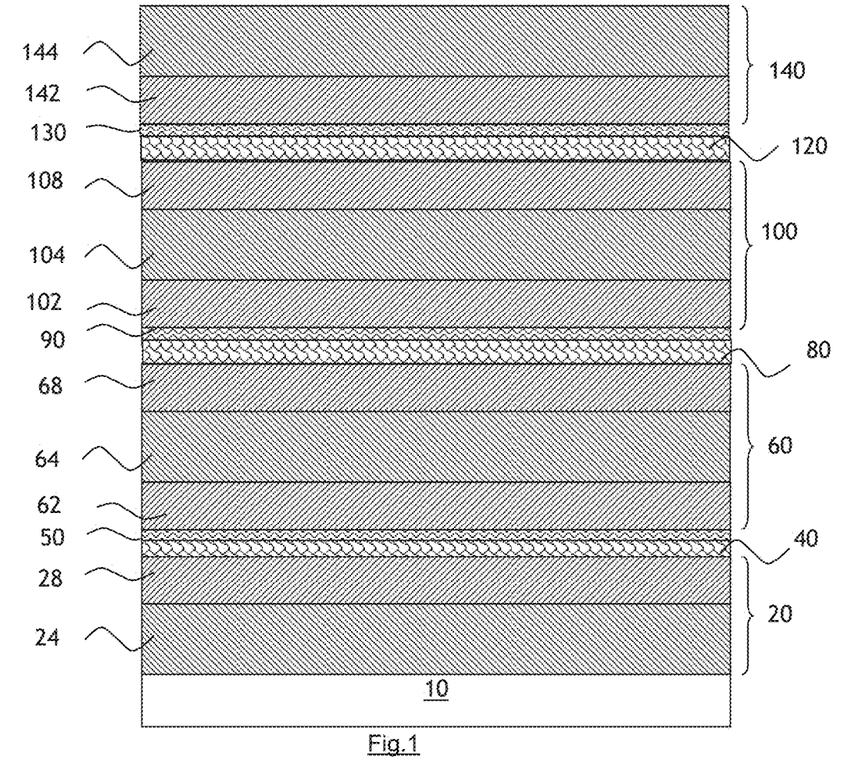
FIG. 1 illustrates a stack structure comprising three functional metal layers according to an embodiment of the invention.

FIG. 1 illustrates a stack structure comprising three functional metal layers 40, 80, 120, this structure being deposited on a transparent glass substrate 10. Each functional layer 40, 80, 120 is positioned between two dielectric coatings 20, 60, 100, 140 so that:

the first functional layer 40 starting from the substrate is positioned between the dielectric coatings 20, 60,
the second functional layer 80 is positioned between the dielectric coatings 60, 100 and
the third functional layer 120 is positioned between the dielectric coatings 100, 140.

These dielectric coatings 20, 60, 100, 140 each comprise at least one dielectric layer 24, 25, 26, 28; 62, 63, 64, 66, 68; 102, 103, 104, 106, 108; 142, 144.

The stack can also comprise:
blocking underlayers 30, 70 and 110 (not represented), 50, 90 and 130 located in contact with a functional layer,
blocking overlayers 50, 90 and 130 located in contact with a functional layer,
a protective layer (not represented).

EXAMPLES

I. Preparation of the Substrates: Stacks, Deposition Conditions and Heat Treatments Stacks of thin layers defined below are deposited on substrates made of clear soda-lime glass with a thickness of 6 mm.

The materials according to the invention and the comparative materials have colors which satisfy the criteria defined in the "colorbox" reference below. The optical characteristics are measured:

on materials in the form of a double glazing of 6/16/4 structure: 6-mm glass/16-mm interlayer space filled with 90% argon/4-mm glass, the stack been positioned on face 2 (the face 1 of the glazing being the outermost face of the glazing, as usual),
on materials in the form of a single glazing with a 6-mm substrate and the stack being positioned on face 2.

TABLE 1

"Colorbox" reference

| Double glazing | | | | | | | | Single glazing | |
|---|---|---|---|---|---|---|---|---|---|
| a*T | b*T | Rext | a*ext | b*ext | Rint | a*int | b*int | a*g60° | b*g60° |
| −5 | 2 | 12 | −3.5 | −5 | 13 | −3 | −3 | −4.5 | −3 |
| ±2.0 | ±1.5 | ±1 | ±1 | ±1.2 | ±3 | ±3 | ±2 | ±2.2 | ±2 |

For the double glazings:
a*T and b*T indicate the colors in transmission a* and b* in the L*a*b* system, measured according to the illuminant D65 at 2° Observer and measured perpendicularly to the glazing;
Rext indicates: the light reflection in the visible region in %, measured according to the illuminant D65 at 2° Observer on the side of the outermost face, the face 1;
a*Rext and b*Rext indicate the colors in reflection a* and b* in the L*a*b* system, measured according to the illuminant D65 at 2° Observer on the side of the outermost face and measured thus perpendicularly to the glazing;
Rint indicates: the light reflection in the visible region in %, measured according to the illuminant D65 at 2° Observer on the side of the interior face, the face 4;
a*Rint and b*Rint indicate the colors in reflection a* and b* in the L*a*b* system, measured according to the illuminant D65 at 2° Observer on the side of the interior face and measured thus perpendicularly to the glazing.

The colorimetric values at an angle a*g60° and b*g60° are measured on a single glazing under an incidence of 60°. This gives an account of the neutrality of the colors at an angle.

In the examples of the invention:
the functional layers are silver (Ag) layers,
the blocking layers are titanium oxide layers,
the high-index layers are chosen from layers based on zirconium silicon nitride and titanium oxide layers,
the barrier layers are based on silicon nitride, doped with aluminum ($Si_3N_4$:Al),
the stabilizing layers are made of zinc oxide (ZnO),
the smoothing layers are based on a mixed oxide of zinc and tin ($SnZnO_x$).

The zirconium silicon nitride layers are deposited from a metal target comprising silicon, zirconium and aluminum.

The conditions for deposition of the layers, which were deposited by sputtering ("magnetron cathode" sputtering), are summarized in table 2.

TABLE 2

| | Target employed | Deposition pressure | Gas | n 550 nm |
|---|---|---|---|---|
| $Si_3N_4$ | Si:Al at 92:8% by weight | $3.2 \times 10^{-3}$ mbar | 55% Ar/ (Ar + $N_2$) | 2.06 |
| SiZrAlN | Si:Al:Zr (70:8:22 at. %) | $3.2 \times 10^{-3}$ mbar | 55% Ar/ (Ar + $N_2$) | 2.22 |
| ZnO | Zn:Al at 98:2% by weight | $1.8 \times 10^{-3}$ mbar | 63% Ar/ (Ar + $O_2$) | 1.95 |
| $SnZnO_x$ | Sn:Zn (60:40% by wt) | $1.5 \times 10^{-3}$ mbar | 39% Ar - 61% $O_2$ | 2.04 |
| $TiO_x$ | $TiO_x$ | $1.5 \times 10^{-3}$ mbar | 88% Ar - 12% $O_2$ | 2.45 |

TABLE 2-continued

| | Target employed | Deposition pressure | Gas | n 550 nm |
|---|---|---|---|---|
| NiCr | Ni (80 at. %):Cr (20 at. %) | $2\text{-}3 \times 10^{-3}$ mbar | 100% Ar | — |
| Ag | Ag | $3 \times 10^{-3}$ mbar | 100% Ar | — | at. = atomic

Table 3 lists the materials and the physical thicknesses in nanometers (unless otherwise indicated) of each layer or coating which forms the stacks as a function of their position with regard to the substrate carrying the stack (final line at the bottom of the table). The "Ref" numbers correspond to the references of FIG. 1.

Each dielectric coating 20, 60, 100 below a functional layer 40, 80, 120 comprises a final stabilizing layer 28, 68, 108 based on crystalline zinc oxide, which is in contact with the functional layer 40, 80, 120 deposited immediately above.

Each dielectric coating 60, 100, 140 above a functional layer 40, 80, 120 comprises a first stabilizing layer 62, 102, 142 based on crystalline zinc oxide, which is in contact with the functional layer 40, 80, 120 deposited immediately above.

Each dielectric coating 20, 60, 100, 140 comprises a high-index dielectric layer 24, 64, 104, 144, based on zirconium silicon nitride or on titanium oxide.

The dielectric coatings 20, 60, 100, 140 can comprise a dielectric layer having a barrier function 25, 63, 103, 143, based on silicon nitride doped with aluminum, known here as $Si_3N_4$.

The dielectric coatings 20, 60, 100 can additionally comprise a smoothing layer based on a mixed oxide of zinc and tin 26, 66, 106.

Each functional metal layer 40, 80, 120 is below and in contact with a blocking layer 50, 90 and 130.

TABLE 3

|  |  | Ref. | Inv. 1 | Inv. 2 | Inv. 3 | Comp. 1 | Comp. 2 | Comp. 3 | Comp. 4 |
|---|---|---|---|---|---|---|---|---|---|
| Dielectric coating M4 | 140 | 38.9 | 34.8 | 31.5 | 41.6 | 38.7 | 50.0 | 50.0 |
| $TiO_x$ | 144 | 0.0 | 0.0 | 23.5 | 0.0 | 0.0 | 0 | 0 |
| SiZrN | 144 | 14.6 | 29.8 | 0.0 | 0.0 | 14.4 | 40.0 | 40.0 |
| $Si_3N_4$ | 143 | 16.3 | 0.0 | 0.0 | 33.6 | 16.3 | 0.0 | 0.0 |
| ZnO | 142 | 8.0 | 5.0 | 8.0 | 8.0 | 8.0 | 10.0 | 10.0 |
| Blocking layer NiCr | 130 | 0.5 | 0.5 | 0.5 | 0.5 | 0.5 | 0.1 | 0.1 |
| Functional layer Ag3 | 120 | 17.7 | 18.0 | 17.6 | 17.7 | 16.5 | 16 | 18 |
| Blocking layer NiCr | 110 | 0.0 | 0.0 | 0.0 | 0.0 | 0.0 | 0.0 | 0.0 |
| Dielectric coating M3 | 100 | 79.1 | 74.4 | 76.8 | 78.6 | 81.0 | 85.0 | 85.0 |
| ZnO | 108 | 8.0 | 5.0 | 8.0 | 8.0 | 8.0 | 10.0 | 10.0 |
| SnZnO | 106 | 8.0 | 0.0 | 0.0 | 0.0 | 0.0 | 6.0 | 6.0 |
| SiZrN | 104 | 26.3 | 64.4 | 60.8 | 0.0 | 0.0 | 59.0 | 59.0 |
| $Si_3N_4$ | 103 | 28.8 | 0.0 | 0.0 | 62.6 | 65.0 | 0.0 | 0.0 |
| ZnO | 102 | 8.0 | 5.0 | 8.0 | 8.0 | 8.0 | 10.0 | 10.0 |
| Blocking layer $TiO_x$ | 90 | 0.5 | 0.5 | 0.5 | 0.5 | 0.5 | 0.1 | 0.1 |
| Functional layer Ag2 | 80 | 14.3 | 14.2 | 13.5 | 11.9 | 13.3 | 16 | 18 |
| Blocking layer NiCr | 70 | 0.0 | 0.0 | 0.0 | 0.0 | 0.0 | 0.0 | 0.0 |
| Dielectric coating M2 | 60 | 71.1 | 67.0 | 72.2 | 65.1 | 72.0 | 87.0 | 87.0 |
| ZnO | 68 | 8.0 | 5.0 | 8.0 | 8.0 | 8.0 | 10.0 | 10.0 |
| SnZnO | 66 | 8.0 | 0.0 | 0.0 | 0.0 | 0.0 | 6.0 | 6.0 |
| SiZrN | 64 | 21.4 | 57.0 | 56.2 | 0.0 | 0.0 | 63.0 | 63.0 |
| $Si_3N_4$ | 63 | 25.7 | 0.0 | 0.0 | 49.1 | 56.0 | 0.0 | 0.0 |
| ZnO | 62 | 8.0 | 5.0 | 8.0 | 8.0 | 8.0 | 8.0 | 8.0 |
| Blocking layer $TiO_x$ | 50 | 0.5 | 0.5 | 0.5 | 0.5 | 0.5 | 0.1 | 0.1 |
| Functional layer Ag1 | 40 | 9.6 | 9.5 | 8.8 | 11.0 | 11.1 | 15 | 18 |
| Blocking layer NiCr | 30 | 0.0 | 0.0 | 0.0 | 0.0 | 0.0 | 0.0 | 0.0 |
| Dielectric coating M1 | 20 | 44.4 | 43.1 | 39.3 | 31.8 | 44.4 | 44.0 | 44.0 |
| ZnO | 28 | 8.0 | 5.0 | 8.0 | 8.0 | 8.0 | 10.0 | 10.0 |
| SnZnO | 26 | 0.0 | 0.0 | 0.0 | 0.0 | 8.0 | 6.0 | 6.0 |
| $Si_3N_4$ | 25 | 8.0 | 0.0 | 0.0 | 23.8 | 0.0 | 0.0 | 0.0 |
| SiZrN | 24 | 28.4 | 38.1 | 0.0 | 0.0 | 28.4 | 28.0 | 28.0 |
| $TiO_x$ | 24 | 0.0 | 0.0 | 31.3 | 0.0 | 0.0 | 0.0 | 0.0 |
| Glass substrate (mm) | 10 | 6.0 | 6.0 | 6.0 | 6.0 | 6.0 | 6.0 | 6.0 |

The characteristics related to the thicknesses of the functional layers and of the dielectric coatings are summarized in table 4.

TABLE 4

|  | Inv. 1 | | Inv. 2 | | Inv. 3 | | Comp. 1 | | Comp. 2 | | Comp. 3 | | Comp. 4 | |
|---|---|---|---|---|---|---|---|---|---|---|---|---|---|---|
| DC | Tp | To | Tp | To | Tp | To | Tp | To | Tp | To | Tp | To | Tp | To |
| M1 | 44.4 | 95.1 | 43.1 | 94.3 | 39.3 | 92.3 | 31.8 | 64.6 | 44.4 | 95.0 | 44.0 | 91.2 | 44.0 | 91.2 |
| M2 | 71.1 | 148.0 | 67 | 146.0 | 72.2 | 156.0 | 65.1 | 132.3 | 72 | 146.6 | 87.0 | 181.7 | 87.0 | 181.7 |
| M3 | 79.1 | 165.2 | 74.4 | 162.5 | 76.8 | 166.2 | 78.6 | 160.2 | 81 | 165.1 | 85.0 | 176.8 | 85.0 | 176.8 |
| M4 | 38.9 | 81.1 | 34.8 | 75.9 | 31.5 | 73.2 | 41.6 | 83.8 | 38.7 | 80.7 | 50.0 | 105 | 50.0 | 105 |
| Ag2/Ag1 | 1.49 | | 1.49 | | 1.53 | | 1.08 | | 1.20 | | 1.07 | | 1.00 | |
| Ag3/Ag2 | 1.24 | | 1.27 | | 1.30 | | 1.49 | | 1.24 | | 1.00 | | 1.00 | |
| Ag1 + Ag2 + Ag3 | 41.60 | | 41.70 | | 39.90 | | 40.60 | | 40.85 | | 47 | | 54 | |
| M1 Tohi1/To1 | 0.66 | | 0.90 | | 0.83 | | 0.00 | | 0.66 | | 0.66 | | 0.66 | |
| M2 Tohi2/To1 | 0.32 | | 0.87 | | 0.81 | | 0.00 | | 0.00 | | 0.72 | | 0.72 | |
| M3 Tohi3/To1 | 0.35 | | 0.88 | | 0.81 | | 0.00 | | 0.00 | | 0.72 | | 0.72 | |

TABLE 4-continued

|  | Inv. 1 | | Inv. 2 | | Inv. 3 | | Comp. 1 | | Comp. 2 | | Comp. 3 | | Comp. 4 | |
| --- | --- | --- | --- | --- | --- | --- | --- | --- | --- | --- | --- | --- | --- | --- |
| DC | Tp | To | Tp | To | Tp | To | Tp | To | Tp | To | Tp | To | Tp | To |
| M4 Tohi4/To1 | | 0.40 | | 0.87 | | 0.79 | | 0.00 | | 0.40 | | 0.82 | | 0.82 |
| Σ Tp BL | | 1.50 | | 1.50 | | 1.50 | | 1.50 | | 1.50 | | 0.30 | | 0.30 |

DC: Dielectric coating; BL: Blocking layer; Tp: Physical thickness; To: Optical thickness.

II. "Solar Control" Performance Results

The energy performance results obtained when the glazings form parts of a double glazing as are described above are listed in table 5.

TABLE 5

| | Target value | Inv. 1 | Inv. 2 | Inv. 3 | Comp. 1 | Comp. 2 | Comp. 3 | Comp. 4 |
| --- | --- | --- | --- | --- | --- | --- | --- | --- |
| "g" % | ≤34.0% | 32.9 | 33.6 | 34.0 | 34.82 | 34.35 | 28.4 | 23.5 |
| "s" | >2.00 | 2.10 | 2.06 | 2.00 | 1.93 | 1.99 | 2.26 | 2.5 |
| LT % | ≈70% | 69.0 | 69.3 | 68.1 | 67.06 | 68.4 | 64.4 | 58.9 |

In the first embodiment (Inv.1), each dielectric coating M1 to M4 comprises a high-index layer based on zirconium silicon nitride.

In the second embodiment (Inv.2), each dielectric coating M1 to M4 comprises a high-index layer based on zirconium silicon nitride and the ratio of the optical thickness of this high-index layer to the optical thickness of the dielectric coating containing it is greater than 0.5, preferably greater than 0.8. The best performance results are obtained for this example.

In the third embodiment (Inv.3), the dielectric coatings M1 and M4 comprise high-index layers based on $TiO_2$ and the dielectric coatings M2 and M3 comprise high-index layers based on zirconium silicon nitride. The performance results are less advantageous than when all the dielectric coatings are based on SiZrN but better than those obtained with for comparative examples 1 and 2.

In comparative example 1, no dielectric coating M1 to M4 comprises a high-index layer with an optical thickness of greater than 20 nm.

In comparative example 2, the dielectric coatings M1 and M4 do not comprise a high-index layer with an optical thickness of greater than 20 nm and the dielectric coatings M2 and M3 contain high-index layers based on zirconium silicon nitride. The performance results are poorer than those obtained for the materials of the invention, each dielectric coating of which comprises a high-index layer.

Figure 2:
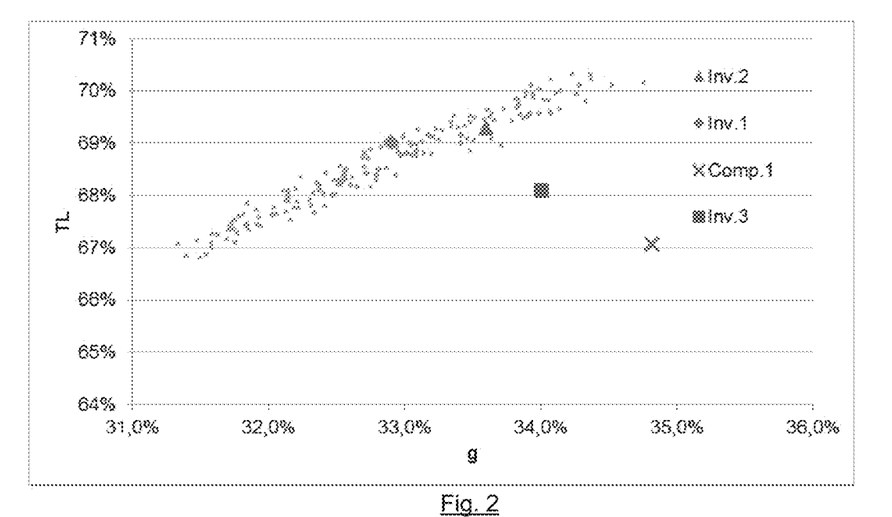
FIG. 2 represents the variation of light transmission TL as a function of the solar factor for different examples.

The performance results obtained with the different examples are summarized in FIG. 2. A scatter of points is given in order to illustrate the range of performance results which are accessible, while retaining the colors in the reference colorbox, with the materials of type Inv.1 and Inv.2, that is to say materials comprising, in each dielectric coating, a high-index layer based on zirconium silicon nitride.

According to the invention, it is possible to produce a glazing comprising a stack having three functional metal layers with exhibits a light transmission of approximately 70%, a high selectivity, a low light reflection and a low solar factor. The glazings according to the invention simultaneously exhibit a solar factor of less than or equal to 34% and a selectivity of greater than 2.00. These glazings additionally exhibit an external reflection at least less than 15%.

The examples according to the invention all exhibit a pleasant and subdued coloration in transmission, preferably within the range of the blues or blue-greens.

The solution provided thus makes it possible to achieve the following performance results:
 a light transmission of approximately 70%,
 a solar factor of approximately 33%,
 a low reflection on the external side, and
 a neutral esthetic quality.

The invention claimed is:

1. A material comprising a transparent substrate coated with a stack of layers successively comprising, starting from the substrate, an alternation of three silver-based functional metal layers denoted, starting from the substrate, first, second and third functional layers, the thicknesses of the functional metal layers, starting from the substrate, increase as a function of the distance from the substrate, and of four dielectric coatings denoted, starting from the substrate, a first dielectric coating M1, a second dielectric coating M2, a third dielectric coating M3 and a fourth dielectric coating M4, each dielectric coating comprising at least one dielectric layer, so that each functional metal layer is positioned between two dielectric coatings, wherein:
 the first, second, third and fourth dielectric coatings M1, M2, M3 and M4 each have an optical thickness To1, To2, To3 and To4, respectively,
 each dielectric coating comprises at least one high-index dielectric layer, the refractive index of which is at least 2.15 and the optical thickness of which is greater than 20 nm,
 a sum of the optical thicknesses of all the high-index dielectric layers of one and the same dielectric coating is denoted, according to the dielectric coating concerned, Tohi1, Tohi2, Tohi3 or Tohi4,
 each dielectric coating satisfies the following relationship:
 Tohi1/To1>0.30,
 Tohi2/To2>0.30,
 Tohi3/To3>0.30,
 Tohi4/To4>0.30,
wherein the three silver-based functional metal layers satisfy the following characteristics:
 a ratio of the thickness of the second functional metal layer to the thickness of the first functional metal layer is between 1.20 and 2.00, including these values, and/or a ratio of the thickness of the third functional metal layer to the thickness of the second functional metal layer is between 1.20 and 1.80, including these values.

2. The material as claimed in claim 1, wherein the stack additionally comprises at least one blocking layer located in contact with one of the functional metal layers, which at least one blocking layer is chosen from metal layers, metal nitride layers, metal oxide layers and metal oxynitride layers of one or more elements chosen from titanium, nickel, chromium and niobium.

3. The material as claimed in claim 1, wherein the first, second, third and fourth dielectric coatings M1, M2, M3 and M4 each have an optical thickness To1, To2, To3 and To4 satisfying the following relationship: To4<To1<To2<To3.

4. The material as claimed in claim 1, wherein the high-index dielectric layers exhibit a refractive index of less than or equal to 2.35.

5. The material as claimed in claim 1, wherein each dielectric coating satisfies the following relationship:
Tohi1/To1>0.80,
Tohi2/To2>0.80,
Tohi3/To3>0.80,
Tohi4/To4>0.80.

6. The material as claimed in claim 1, wherein at least two dielectric coatings comprise a high-index dielectric layer based on zirconium silicon nitride.

7. The material as claimed in claim 1, wherein each dielectric coating comprises a high-index dielectric layer based on zirconium silicon nitride.

8. The material as claimed in claim 1, wherein the dielectric coatings satisfy the following characteristics:
the optical thickness of the first dielectric coating M1 is from 60 to 140 nm,
the optical thickness of the second dielectric coating M2 is from 120 to 180 nm,
the optical thickness of the third dielectric coating M3 is from 140 to 200 nm,
the optical thickness of the fourth dielectric coating M4 is from 50 to 120 nm.

9. The material as claimed in claim 1, wherein each dielectric coating additionally comprises at least one dielectric layer, a refractive index of which is less than 2.15.

10. The material as claimed in claim 1, wherein the stack, defined starting from the transparent substrate, comprises:
the first dielectric coating M1 comprising at least one high-index dielectric layer, optionally a layer having a barrier function, a dielectric layer having a stabilizing function,
optionally a blocking layer,
the first functional layer,
optionally a blocking layer,
the second dielectric coating M2 comprising at least one lower dielectric layer having a stabilizing function, optionally a layer having a barrier function, a high-index dielectric layer, optionally a layer having a smoothing function, an upper dielectric layer having a stabilizing function,
optionally a blocking layer,
the second functional layer,
optionally a blocking layer,
the third dielectric coating M3 comprising at least one lower dielectric layer having a stabilizing function, optionally a layer having a barrier function, a high-index dielectric layer, optionally a layer having a smoothing function, an upper dielectric layer having a stabilizing function,
optionally a blocking layer,
the third functional layer,
optionally a blocking layer,
the fourth dielectric coating M4 comprising at least one dielectric layer having a stabilizing function, optionally a layer having a barrier function, a high-index dielectric layer and optionally a protective layer.

11. A process for obtaining a material as claimed in claim 1, comprising depositing the layers of the stack by magnetron cathode sputtering.

12. A glazing comprising at least one material as claimed in claim 1.

13. The glazing as claimed in claim 12, wherein the stack is positioned in the glazing so that an incident light originating from the outside passes through the first dielectric coating before passing through the first functional metal layer.

14. The glazing as claimed in claim 12, wherein the glazing is in the form of a multiple glazing.

15. The glazing as claimed in claim 2, wherein the at least one blocking layer is selected from the group consisting of Ti, TiN, $TiO_2$, Nb, NbN, Ni, NiN, Cr, CrN, NiCr or NiCrN layer.

16. The glazing as claimed 15, wherein the glazing is in the form of a double glazing or a triple glazing.

* * * * *